(No Model.)

J. G. COBURN.
AXLE LUBRICATOR.

No. 505,265. Patented Sept. 19, 1893.

Witnesses

Inventor
John G. Coburn
his Attorneys

UNITED STATES PATENT OFFICE.

JOHN G. COBURN, OF CARTHAGE, ASSIGNOR OF ONE-HALF TO ALBION P. MARSH, OF DIXFIELD, MAINE.

AXLE-LUBRICATOR.

SPECIFICATION forming part of Letters Patent No. 505,265, dated September 19, 1893.

Application filed September 29, 1892. Serial No. 447,252. (No model.)

*To all whom it may concern:*

Be it known that I, JOHN G. COBURN, a citizen of the United States, residing at Carthage, in the county of Franklin and State of Maine, have invented certain new and useful Improvements in Axle-Lubricators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to axles and lubricators therefor, and has for its object to improve the general construction and operation of such devices.

My invention consists generally in an axle provided with a straight and inclined passage for the oil, a nut having an aperture which when the same is applied registers with said passage, and a box having an annular chamber adjacent to the outlet of the oil passage.

My invention also consists in the construction, relative arrangement and operation of said parts, all of which will fully and clearly appear from a reading of the following description taken in connection with the accompanying drawings in which—

Figure 1:
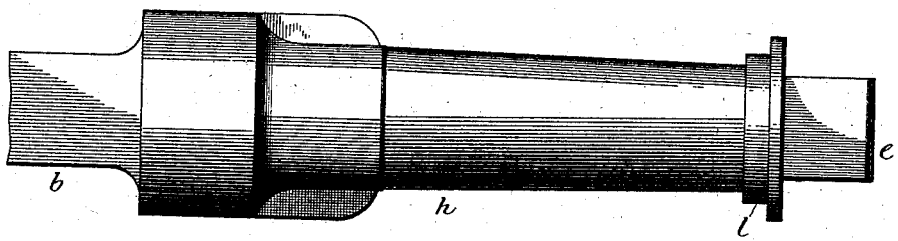
Figure 2:
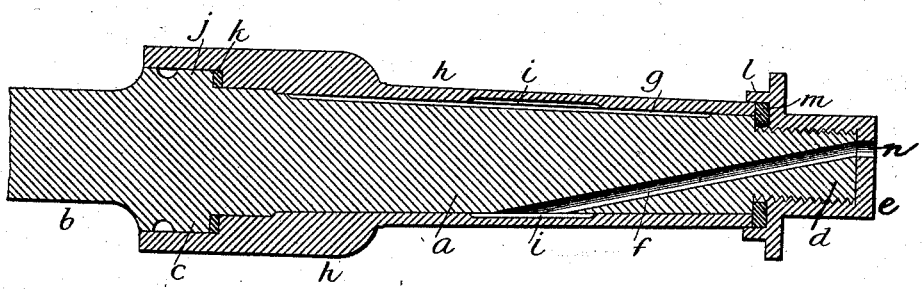
Figure 3:
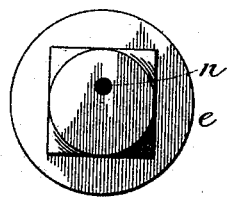

Figure 1 illustrates in side elevation the axle, box, and nut. Fig. 2 is a vertical longitudinal section thereof, and Fig. 3 an end view of the nut employed.

The reference letter $a$ denotes the axle, and $b$ a portion of the tree. The axle is provided with the usual flange $c$ and reduced screw-threaded end $d$ which latter receives the nut $e$ presently to be described.

$f$ is a passage for the oil, which is straight, and extends from the end $d$ to the periphery of the axle about midway of its length. The axle is also provided with an oil groove $g$ on its upper side.

$h$ represents the box, the opening therein conforming in shape to the axle, except at its central portion where it is cut away to form an annular chamber $i$ which is adjacent to the outlet of the passage $f$ and constitutes a reservoir for the oil, and this chamber and outlet being located midway of the length of the axle the oil is equally distributed. The inner end of the box is enlarged and is formed with a socket $j$ to receive the flange $c$ of the axle, a suitable washer $k$ being interposed between said flange and the inner end of the socket to prevent leakage of the oil.

The nut $e$ is provided with a flange $l$ which surrounds the outer end of the box, and $m$ is a washer which is interposed between said outer end and the nut and operates to prevent the leakage of the oil at this point. The nut is provided with an aperture $n$ which when the nut is applied registers with the passage, and oil or other lubricant is admitted through this aperture when desired, without the necessity of removing the wheel. The passage being inclined as shown the oil readily flows downward to the reservoir, and is distributed from the latter to the axle throughout its bearing surface. By reason of employing a straight passage a wire or other suitable device may be inserted at any time to clear the same, and preserve an uninterrupted passage for the oil.

The device is simple in construction and operation, and a thorough lubrication of the parts may be maintained a considerable length of time with one application of oil.

I claim—

An axle and lubricator therefor comprising an axle having a passage extending from a point above the center of its outer end, and inclining downward to a point in the periphery midway of its length, said passage being uninterrupted for the purpose described, a nut for the axle having an aperture normally registering with the passage, and adapted to be moved out of register, a box surrounding the axle, and having an inner annular oil chamber at the inner end of the passage, all as set forth.

In testimony whereof I affix my signature in presence of two witnesses.

JOHN G. COBURN.

Witnesses:
ARTHUR BROWNING,
WILL T. NORTON.